United States Patent [19]

Ichikawa et al.

[11] Patent Number: 5,002,090

[45] Date of Patent: Mar. 26, 1991

[54] FLOW DETECTOR

[75] Inventors: Minoru Ichikawa, Owariasahi; Kotaro Kashiyama; Yukihiro Imaeda, both of Inuyama, all of Japan

[73] Assignee: Daido Metal Company, Ltd., Nagoya, Japan

[21] Appl. No.: 361,887

[22] Filed: Jun. 6, 1989

[30] Foreign Application Priority Data

Jun. 6, 1988 [JP] Japan ................... 63-138266

[51] Int. Cl.$^5$ .................... E03B 7/07; F16K 37/00
[52] U.S. Cl. .................... 137/550; 137/554; 324/207.2; 340/606
[58] Field of Search ............. 137/554, 550; 340/606, 340/611, 616; 73/861.54; 324/208

[56] References Cited

U.S. PATENT DOCUMENTS

| | | | |
|---|---|---|---|
| 1,967,017 | 7/1934 | Bohner | 340/606 X |
| 2,896,663 | 7/1959 | Mena | 137/550 X |
| 3,243,692 | 3/1966 | Heissmeier et al. | 324/208 X |
| 4,315,436 | 2/1982 | McCabe et al. | 73/861.54 |
| 4,507,976 | 4/1985 | Banko | 73/861.54 |
| 4,590,962 | 5/1986 | Tespa | 137/550 X |
| 4,737,710 | 4/1988 | Van Antwerp et al. | 324/208 |
| 4,777,979 | 10/1988 | Twerdochlib | 137/554 |
| 4,793,241 | 12/1988 | Mano et al. | 324/208 X |

FOREIGN PATENT DOCUMENTS

| | | |
|---|---|---|
| 49-74055 | 7/1974 | Japan . |
| 61-231416 | 10/1986 | Japan . |
| 2195768 | 4/1988 | United Kingdom . |

Primary Examiner—John Rivell
Attorney, Agent, or Firm—Browdy and Neimark

[57] ABSTRACT

A flow detector according to the present invention is arranged in a fluid piping circuit, or at an inlet or an outlet of the fluid piping circuit and has a fluid inlet and a fluid outlet, and further comprises a piston having a magnetic member as a part thereof and reciprocated by pressure difference of the fluid between the fluid inlet and the fluid outlet, a fixed magnetic member positioned at a predetermined distance from the piston, and a detection sensor arranged in a position where the detection sensor is subject to alternate magnetic action from the magnetic member of the piston when the piston is reciprocated at a predetermined stroke, for detecting a flow of the fluid in response to change in the magnetic action.

5 Claims, 2 Drawing Sheets

1

FLOW DETECTOR

BACKGROUND OF THE INVENTION

The present invention relates to a flow detector suitable for detecting a fluid flow at any position in a piping circuit for controlling the fluid.

In the past, flow detectors of differential transformer type have been proposed as disclosed in the Japanese Patent Unexamined Publication Nos. 61-231416 and 49-75055 and as described in the Japanese Utility Model Application Nos. 62-20553, 62-20554 and 62-20555.

Such conventional flow detectors have the following problems. That is to say, firstly, the flow detector cannot detect a fluid flow when a difference in pressure between a fluid inlet and a fluid outlet thereof is very small and the flowing speed of the fluid passing therethrough is very slow. Secondly, since the flow detector itself is large-sized, it is difficult to incorporate the flow detector into a piping circuit for controlling the fluid. Thirdly, since the level of a signal outputted from the flow detector is too low, it is necessary to provide an amplifier circuit. Lastly, since a large stroke of a piston including a magnetic member is required for obtaining an optimum signal, a body of the flow detector will be over-sized.

SUMMARY OF THE INVENTION

An object of the present invention is to solve the above-mentioned conventional problems.

According to an aspect of the present invention, there is provided a flow detector which can be arranged in a fluid piping circuit, or at an inlet or an outlet of the fluid piping circuit and which has a fluid inlet and a fluid outlet, the flow detector including a piston having a magnetic member as a part thereof and reciprocated by pressure difference of the fluid between the fluid inlet and the fluid outlet, a fixed magnetic member positioned at a predetermined distance from the piston, and a detection sensor arranged in a position where it is subject to alternate magnetic action from the magnetic member of the piston when the piston is reciprocated at a predetemined stroke, for detecting a flow of the fluid in response to change in the magnetic action.

DESCRIPTION OF THE DRAWINGS

FIG. 1b is an end view of the flow detector of FIG. 1a;

FIG. 2a is a side view of a piston of the flow detector of FIG. 1a;

FIG. 2b is an end view of the piston of FIG. 2a; and

DESCRIPTION OF THE PREFERRED EMBODIMENTS

Figure 1A:
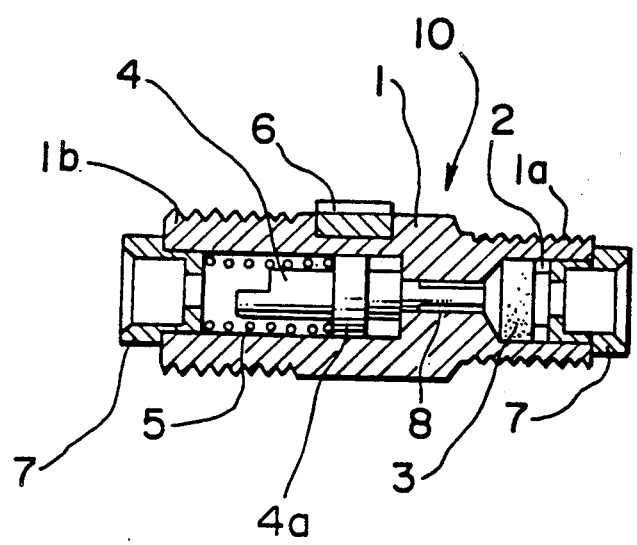
FIG. 1a is a longitudinal sectional view of a flow detector according to a preferred embodiment of the present invention.
Figure 1B:
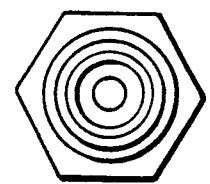

Referring to FIGS. 1a and 1b, a flow detector 10 according to a preferred embodiment of the present invention comprises a body 1, a fixed magnetic member 2, a filter 3, a piston 4, a spring 5 for biasing the piston, a detection sensor 6 and end bushes 7 fixed to both ends of the body 1.

More particularly, the body 1 of the flow detector has threaded portions 1a and 1b each having a diameter of thread such as $R\frac{1}{8}$ (Japanese Industrial Standard) or M8 usually applied to conventional or general fluid controlling piping circuits. The fixed magnetic member 2 and the filter 3 for removing foreign matters from the fluid are arranged in a fluid inlet portion positioned on the right end (FIG. 1a) of the flow detector. The filter 3 may be formed by PVF having, for example, mesh of about 30μ. The piston 4 has a magnetic member 4a and is arranged in a fluid passage for reciprocal movement to block the fluid passage. The magnetic member 4a is fixed to the piston 4, and thus, can be reciprocated together with the piston.

Figure 2A:
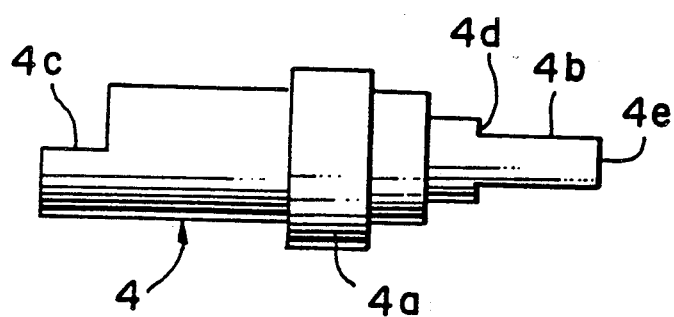
Figure 2B:
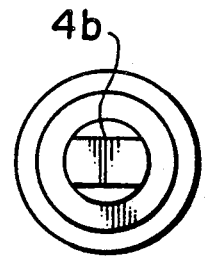

As shown in FIGS. 2a and 2b, the piston 4 has notches 4b and 4c on both ends thereof. The notch 4c serves to permit the fluid flow flowing out of the flow detector even when the end of the piston 4 moving in the fluid passage in the body 1 abuts against the left end bush 7. Since the piston 4 is always biased toward one direction by means of the spring 5, the piston acts as a one-way valve which allows the fluid to flow toward the fluid outlet only when a valve portion 4d of the piston 4 is separated from a passage portion 8 (within which the valve portion 4d can slide) of the fluid passage in the body 1 due to the pressure of the fluid. The spring 5 serves to ensure an accurate and smooth reciprocal movement of the piston 4.

The detection sensor 6 comprises a small-sized semiconductor integrated circuit having a hall element and an amplifier circuit, and is arranged on the body 1 in a position where it can effectively catch or detect the change in magnetic field created between the magnetic member 4a of the piston and the fixed magnetic member 2 when the magnetic member 4a moves along with the piston.

Figure 3:
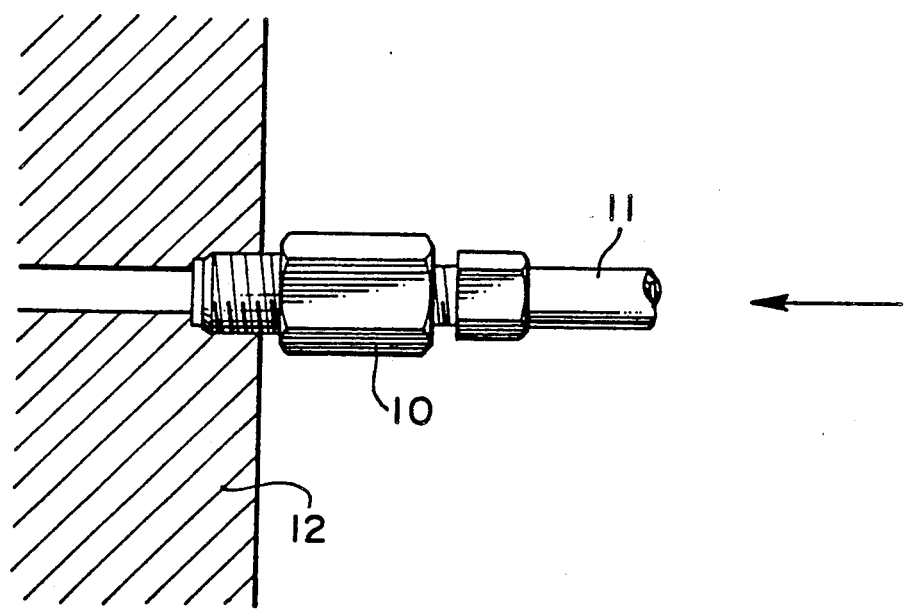
FIG. 3 shows a condition that the flow detector according to the present invention is incorporated into a fluid machine including a piping circuit.

The flow detector is incorporated into the piping circuit to which the flow detector is to be applied, in a condition that the direction of the flow detector directing from the light end thereof toward the left end thereof is aligned with a direction of the fluid flow. FIG. 3 shows an example of installation of the flow detector. In the example shown in FIG. 3, the flow detector 10 is connected to a pipe 11 of the piping circuit and to a fluid machine 12.

In operation, when the fluid is flowing through the flow detector by maintaining the pressure difference between the fluid inlet and the fluid outlet thereof, the fluid entered into the flow detector from the fluid inlet thereof pushes and end 4e of the piston 4 to shift the piston toward the fluid outlet. As the piston 4 is shifted, the magnetic field between the magnetic members 2 and 4a is varied or changed. Such change in the magnetic field is detected by the small-sized semi-conductor integrated circuit of the detection sensor 6, thus activating the hall element to emit a detection signal, whereby the fluid flow is detected on the basis of such signal.

According to the present invention, the flow detector can be more compact in comparison to conventional detectors, and can detect the fluid flow accurately even the pressure difference between the fluid inlet and the fluid outlet is very small and/or the flowing speed of the fluid is very slow.

What is claimed is:

1. A flow detector body arranged in a liquid piping circuit, or at an inlet or an outlet of the liquid piping circuit and having a liquid inlet and a liquid outlet, comprising:

a piston having a magnetic member as a part thereof and reciprocated by pressure difference of the liquid between said liquid inlet and said liquid outlet;

a fixed magnetic member positioned at a predetermined distance from said piston having a magnetic member as a part thereof, in the inlet of said flow detector body; and a detection sensor arranged in a position on said body where said detection sensor is subject to alternate magnetic action from said magnetic member of said piston when said piston is reciprocated at a predetermined stroke, for detecting a flow of the liquid in response to change in said magnetic action; wherein said detection sensor comprises a small-size semiconductor integrated circuit obtained by integrating a hall element for emitting a signal in response to the change in said magnetic action and an amplifier circuit in one tip, and wherein end bushes are fixed to both ends of said body.

2. A flow detector according to claim 1, wherein reciprocal movement of said piston having said magnetic member thereon is performed by the pressure difference of the liquid between said liquid inlet and said liquid outlet and by a restoring spring arranged between said piston and said liquid outlet.

3. A flow detector according to claim 1, further including a filter provided in said liquid inlet for removing foreign matters from the liquid, thereby ensuring said reciprocal movement of said piston having said magnetic member thereon and preventing inconvenience due to the presence of said foreign matters from occurring at a position where the liquid is finally used.

4. A flow detector according to claim 1, wherein said piston acts as a one-way valve for preventing the liquid flow in a direction directing from said liquid outlet toward said liquid inlet.

5. A flow detector according to claim 2, further including a filter provided in said liquid inlet for removing foreign matters from the liquid, thereby ensuring said reciprocal movement of said piston having said magnetic member thereon and preventing inconvenience due to the presence of said foreign matters from occuring at a position where the liquid is finally used.

* * * * *